United States Patent
Rautakoski et al.

(10) Patent No.: US 11,371,584 B2
(45) Date of Patent: Jun. 28, 2022

(54) WASTE MANAGEMENT DEVICE AND A MODULAR POWER SYSTEM FOR SUCH

(71) Applicant: Tana Oy, Jyväskylä (FI)

(72) Inventors: Kari Rautakoski, Leppävesi (FI); Miiro Ryyppö, Vaajakoski (FI); Roni Ryyppö, Jyväskylä (FI)

(73) Assignee: Tana Oy, Jyväskylä (FI)

( * ) Notice: Subject to any disclaimer, the term of this patent is extended or adjusted under 35 U.S.C. 154(b) by 198 days.

(21) Appl. No.: 16/829,092

(22) Filed: Mar. 25, 2020

(65) Prior Publication Data
US 2020/0309233 A1 Oct. 1, 2020

(30) Foreign Application Priority Data
Mar. 26, 2019 (EP) .................................... 19165103

(51) Int. Cl.
| | | |
|---|---|---|
| *F16H 1/22* | (2006.01) | |
| *B09B 3/00* | (2022.01) | |
| *F16H 37/06* | (2006.01) | |
| *B09B 1/00* | (2006.01) | |

(52) U.S. Cl.
CPC .............. *F16H 1/227* (2013.01); *B09B 3/00* (2013.01); *F16H 37/065* (2013.01)

(58) Field of Classification Search
CPC ......... F16H 1/227; F16H 37/065; B09B 3/00; B09B 1/00
See application file for complete search history.

(56) References Cited

U.S. PATENT DOCUMENTS

| | | | | |
|---|---|---|---|---|
| 4,919,345 A | * | 4/1990 | Burlington ............ | B02C 18/142 241/101.2 |
| 5,463,914 A | | 11/1995 | Tyan | |
| 8,469,127 B2 | * | 6/2013 | Tarasinski ................ | B60K 6/26 180/65.285 |
| 9,540,787 B2 | * | 1/2017 | West ........................ | E02F 3/847 |
| 2011/0280699 A1 | * | 11/2011 | Zimmermann ........ | B60P 1/4471 414/539 |
| 2012/0027533 A1 | * | 2/2012 | Hall ......................... | E01C 19/26 409/235 |
| 2013/0157808 A1 | * | 6/2013 | Treichel ................. | B60K 6/365 477/15 |
| 2013/0306767 A1 | * | 11/2013 | Becker .................... | B02C 13/30 241/37.5 |
| 2015/0273479 A1 | * | 10/2015 | Dillard, Jr. ............. | B02C 18/24 241/30 |
| 2018/0093564 A1 | * | 4/2018 | Long ..................... | A01D 69/025 |

FOREIGN PATENT DOCUMENTS

| | | |
|---|---|---|
| CN | 103795181 A | 5/2014 |
| WO | 2010031511 A1 | 3/2010 |

* cited by examiner

*Primary Examiner* — Tinh Dang
(74) *Attorney, Agent, or Firm* — MacMillan, Sobanski & Todd, LLC

(57) ABSTRACT

A waste management device and a modular power system for such are disclosed. The waste management device may be a compactor or a shredder. The waste management device includes a cylindrical component for handling the waste, and a modular power system arranged to transmit power from one/more motors to the cylindrical component. The modular power system includes an internal gear wheel, a frame and one or more motors attached to the frame. Driving gear wheels of the motors are operably connected to the internal gear wheel such that power of the one or more motors is transmitted from the driving gear wheel(s) to the internal gear wheel.

14 Claims, 5 Drawing Sheets

WASTE MANAGEMENT DEVICE AND A MODULAR POWER SYSTEM FOR SUCH

PRIORITY

This application is a U.S. non-provisional application, and claiming priority of European application EP19165103.3, filed on Mar. 26, 2019, the contents of all of which are incorporated herein by reference.

TECHNICAL FIELD

The invention relates to a modular power system and a waste management device, like a shredder or a compactor.

BACKGROUND

Waste management devices are used for handling waste material. A shredder is used for shredding waste material, for example before recycling. Shredding may be implemented in one or more phases depending on material, for example. Waste material may comprise municipal waste, household waste, tyres, industrial waste, construction waste, demolition waste, plastics, waste wood, shingles, cables, wires and other special materials.

Landfill areas may be compacted by driving a compactor over the areas. Compacting a landfill area provides smoothness and firmness to the compacted land area, on which waste trucks may drive and operate safely.

SUMMARY

An object of embodiments is to provide a modular power system for a waste management device, where the modular power system provides flexibility to use of the waste management device.

The object is achieved by a modular power system, where amount of motor units may be increased. The motor units are placeable at one, single end of a cylindrical component, which is arranged to handle waste. Further, the motor units are controllable separately and/or individually. This provides flexibility to use in different situations and/or according to different requirements.

Use of a waste management system may depend on at least type of waste material to be handled, material flow, as well as speed, capacity and strength of a waste management device. Different kind of properties of a waste management device may be utilized for different sources, shipments or sets of waste material. In addition, use of a waste management device and desired properties of it may change over time. For example, mass of waste may comprise mixed waste of different kind, which may pose different kind of requirements for a waste management device. Thus, one device may suit or be fitted to a certain extend with its limitations. The limitations may relate to speed, capacity, power and/or structural properties of a waste management device.

According to an aspect of the invention a modular power system comprises a frame, at least one motor attached to the frame and an internal gear wheel. The at least one motor comprises a driving gear wheel, which is operably connected to the internal gear wheel such that power of the at least one motor is transmitted from the driving gear wheel to the internal gear wheel.

According to another aspect of the invention a waste management device comprises a modular power system and a cylindrical component for handling waste, wherein the modular power system is operably connected to the cylindrical component.

A waste management device may be a compactor and a cylindrical component may be to a roller of a compactor. Alternatively, a waste management device may be a shredder and a cylindrical component may be to a rotor of a shredder.

BRIEF DESCRIPTION OF THE DRAWINGS

In the following description embodiments are described in more detail with the accompanying figures, of which

Figures are presented as illustrations and those may not be in scale.

DETAILED DESCRIPTION

A waste management device may be a compactor or a shredder. A modular power system may be utilized to rotate a cylindrical component of the waste management device. The modular power system comprises places or mountings for multiple motors. A selected number of motors may be attached, fixed or secured to the modular power system, optionally mechanically, hydraulically and/or electrically. One or more motors may be part of the modular power system. The cylindrical component may be a roller of a compactor or a rotor of a shredder. A shredder is illustrated in FIG. 1ab and a compactor is illustrated in FIG. 2ab.

Figure 1A:
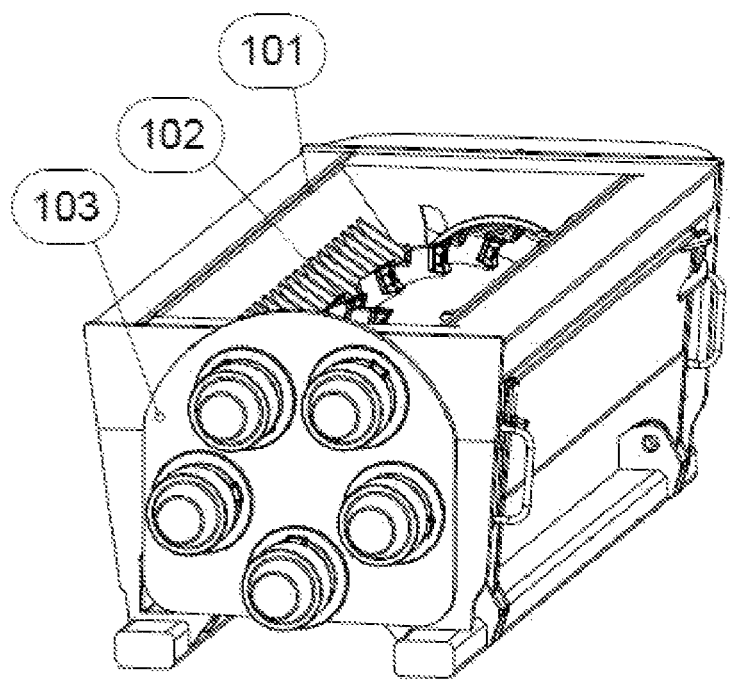
FIG. 1a illustrates a shredder according to an embodiment.
Figure 2A:
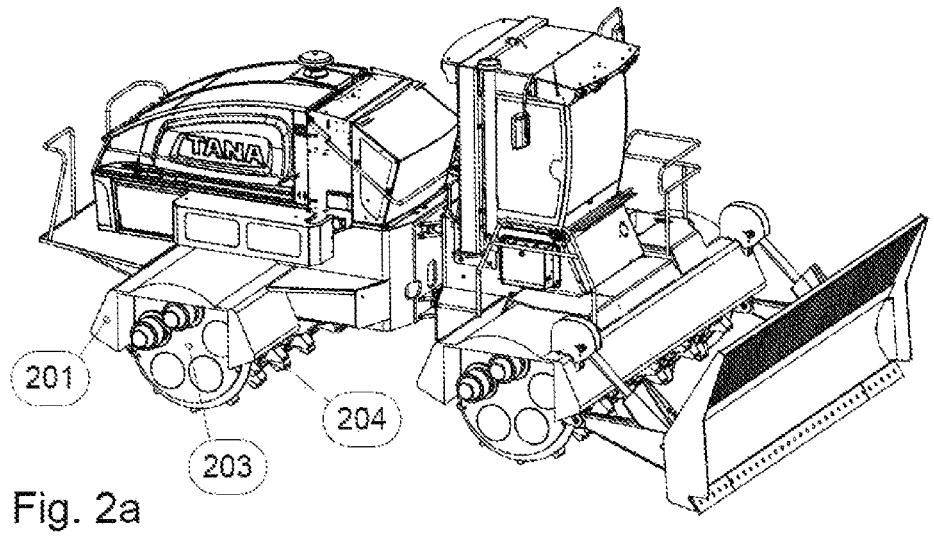
FIG. 2a illustrates a compactor according to an embodiment.

FIG. 1a illustrates a shredder according to an embodiment. The shredder comprises a frame 101 and a rotor 102, which is rotatably attached to the frame 101. The rotor 102 is rotated by motor(s) of a modular power system 103. The modular power system 103 may be attached to one single end of a rotor 102. One or more motors may be attached to the modular power system 103. A rotor 102 comprises blades or alike extensions, which are protruding outward from the cylindrical rotor surface. The rolling blades enable shredding or tearing waste material. Waste material may be arranged fall to a shredder or to a rotor(s) 102 of it. The frame 101 of the shredder may form a funnel via which waste material is directed onto a rotor(s) 102. Shredded material may fall below rotor(s) 102, onto a conveyor, for example.

Figure 1B:
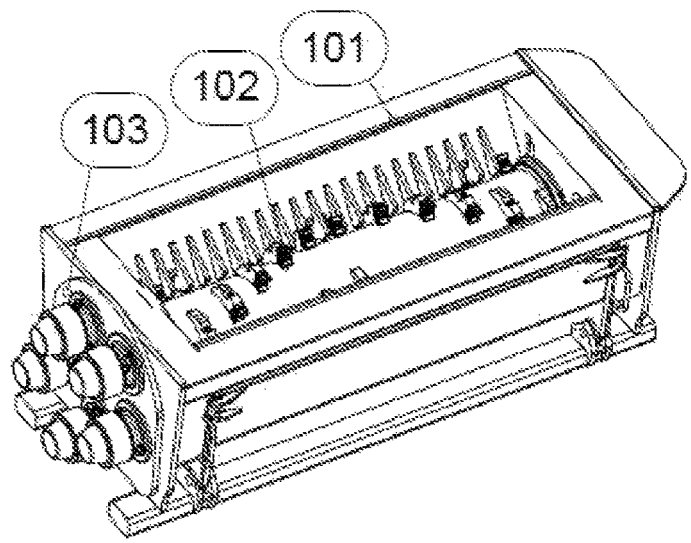
FIG. 1b illustrates a shredder according to an embodiment.

FIG. 1b illustrates a shredder according to an embodiment. The shredder comprises a frame 101 and a rotor 102, which is rotatably attached to the frame 101. The rotor 102 is rotated by one or more motors of a modular power system 103. The shredder may form, or be part of, a waste managing device. A rotor 102 comprises a cylindrical structure. A rotor 102 may comprise length of 2-6 m, or preferably 1-4 m and/or a diameter of 0.5-2.0 m, or preferably 0.9-1.6 m. A rotor of a shredder may be a smooth roller having a smooth cylindrical external surface. Alternatively, as illustrated in FIG. 1b, a rotor may comprise protrusions on its external cylindrical surface in order to enable handling, e.g shredding, crushing or tearing, waste material. Protrusions may be arranged along the whole external surface of a rotor. Alternatively protrusions may be arranged to fluctuate or form a spiral structure along external cylindrical surface of the rotor. An adjacent rotor or a counter-rotor of a shredder may comprise a matching counter-structure on its external surface.

A waste management device comprising one rotor enables providing strength or power, but may lack speed. In previous known solutions a motor, which is arranged to rotate a rotor, has been attached at one end of the rotor. Known mechanical power transmission utilizing a single motor at one end of the rotor has limitations in rotation speed versus torsional moment. Some flexibility has been provided by a rotor having a motor at its both longitudinal ends, and thereby enabling rotating the rotor with one or two motors. When increased power has been desired, both motors at separate rotor ends have been used. In order to increase capacity in previous known solutions, it has been possible to introduce additional rotors parallel, longitudinally next to each other. Use of two or more parallel rotors may enable enhancing capacity, but the implementation may lack torsional moment or strength. For example, stronger material, like a construction waste, may require more power from a waste management device.

A rotor 102 of FIGS. 1a, 1b may be rotated by multiple motors, for example 1-5 motors. Multiple motors may be attached at one or single end of the rotor 102. The motors may be electrical motors or hydraulic motors. In addition, a hybrid comprising both electrical and hydraulic motors may be provided. The motors are separately and/or individually controllable and/or drivable. This enables providing power in accordance to a present need. Power and speed may be controlled using a selected number of motors with a selected power and/or output. Multiple motors at one end of a roller/rotor may provide multiple power inputs from motors to a power transmission. In addition or alternatively, the power transmission may comprise one or more outputs. Power is transmitted from power source, or motors, to the rotor 102 via power transmission. The motors are fixed to a modular power system 103, which is arranged to provide power transmission. The modular power system 103 is arranged to transmit power of the motor(s) to the rotor 102.

FIG. 2a illustrates a compactor according to an embodiment. A compactor may be driven on a landfill or alike area. The compactor comprises rollers or wheels, which form wheel structure of the compactor. Similarly as in a shredder, the rollers of the compactor may comprise blades or alike extensions, which are protruding outward from the external cylindrical roller surface, Rollers are arranged next to a ground or land area to be managed or handled by the compactor. This enables compacting the land areas.

A compactor may comprise two rollers having diameters of 0.5-2.0 m, or preferably 0.9-1.6 m. In known solutions motors may be arranged at one or both ends of the both rollers. A known compactor may provide power, but rotation speed may be modest. For example, transport time from a workplace to another may be extended due to limited speed of the compactor.

Figure 2B:
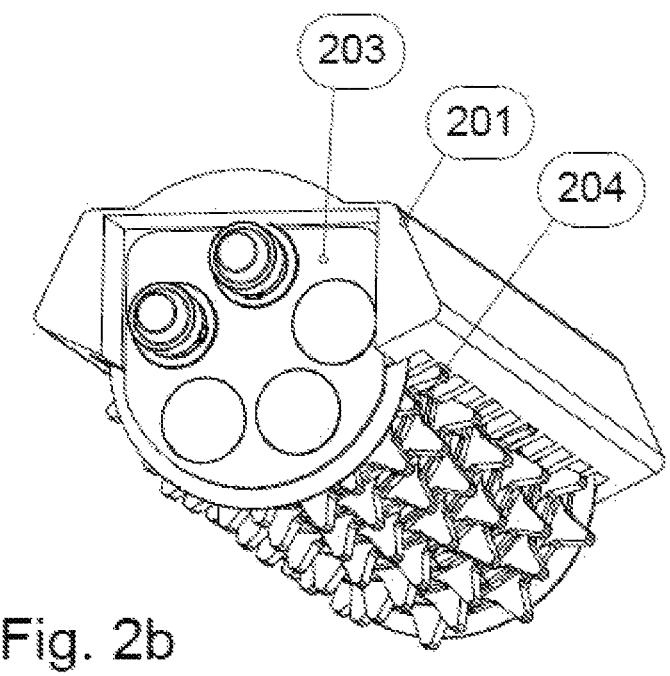
FIG. 2b illustrates a roller of a compactor according to an embodiment.

A roller 204 is rotatably attached to the frame 201 of the compactor. The roller 204 may be rotated by two motors, fixed to a modular power system 203, arranged at one longitudinal end of each roller 204, as illustrated in FIG. 2b. One or more motors may be placed and/or attached at one end of each roller 204. Multiple motors, which are separately and/or individually controllable, enable providing effectivity for both rotation speed and torsional moment. In case more power is desired, it is possible to add another motor to the modular power system 203. The modular power system 203 may comprise places or mountings for multiple motors, e.g. five, as illustrated in FIG. 2a, or more motor units. So, multiple motors may be fixed to the modular power system 203. The motors may be electrical motors or hydraulic motors. The motors are separately controllable and/or drivable. This enables providing power in accordance to a present need. The number of motors driven at a time and the power output of them may be adjusted. Multiple motors at one end of a roller/rotor may provide multiple power inputs from motors to power transmission, which is arranged by the modular power system. In addition or alternatively, the power transmission may comprise one or more outputs for rotating the roller 204.

Multiple motors may be attached, fixed or secured at one end of a roller/rotor mechanically, hydraulically and/or electrically.

Figure 3A:
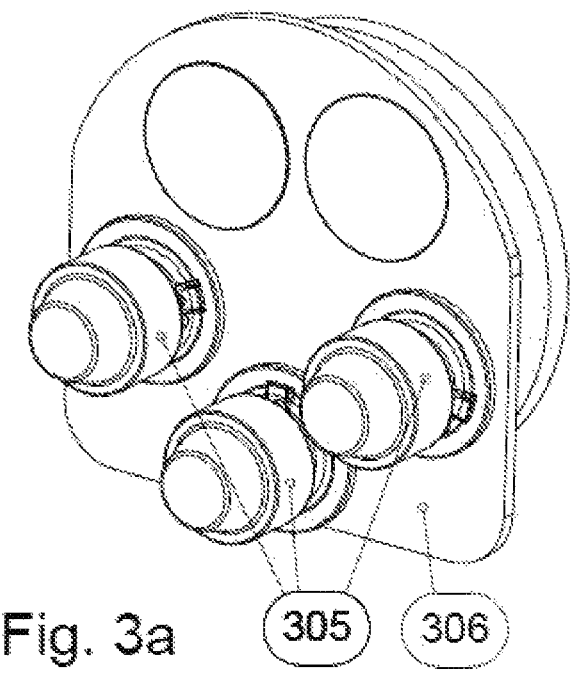
FIG. 3a illustrates a modular power system according to an embodiment.
Figure 3B:
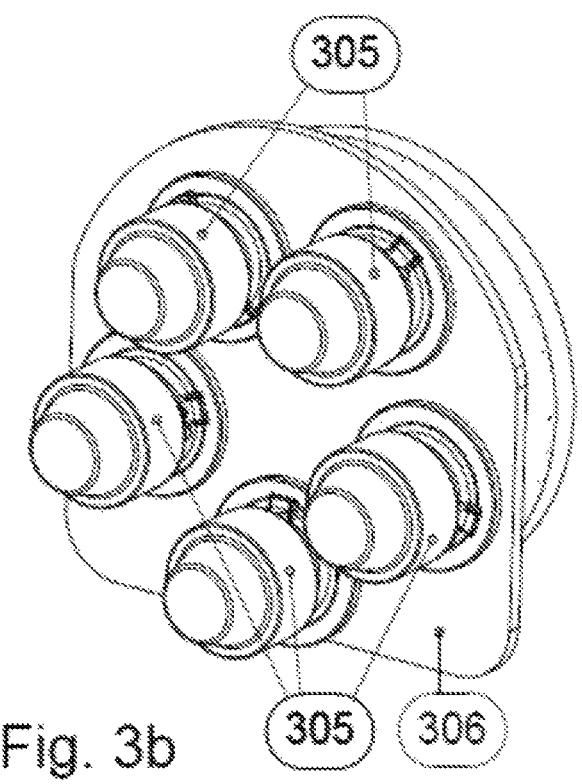
FIG. 3b illustrates a modular power system according to an embodiment.

FIGS. 3a and 3b illustrates a modular power system according to an embodiment. FIG. 3a shows a frame 306 or a cover part of a modular power system. Three motors 305 are attached to the frame 306 of the modular power system. FIG. 3b shows a frame 306 or a cover part of a modular power system, wherein five motors 305 are attached to. The modular power system of FIG. 3a is able to receive five motors. The frame 306 of the modular power system comprises places or mountings for receiving multiple motors. The cover 306 as is illustrated in the FIG. 3a comprises places for receiving two more motors. Multiple motors are fixed to the frame 306 and arranged to transmit power to an internal gear wheel, which is part of a modular power transmission system. The modular power transmission system may be placed and/or attached at one end of a roller of a compactor or at one end of a rotor of a shredder. Different kind of motors 305 may be operably connected to the frame 306 in order to arrange power transmission for the cylindrical rotating parts of the waste management device. Output of the motor(s) 305 may be directed to an internal gear wheel, which is arranged to rotate a roller or a rotor. All the motors 302 may be controlled and driven separately.

Multiple motors may be attached, fixed or secured to the modular power system mechanically, hydraulically and/or electrically. One or more motors may be attached to the modular power system, or as part of the modular power system. Two or more motors may be attached to the modular power system.

The modular power system 306 with motors 305 forms and end structure of a roller of a compactor or a rotor of a shredder. This provides flexibility for driving or rotating the roller(s) of the compactor and the rotor(s) of the shredder. The one or more motor(s) 305 may be driven separately or together at any combination. In addition, different kind of motors may be used, as well as motors of different sizes and/or power output. For example electric motor(s) may be driven in order to provide rotation speed. Hydraulic motor(s) may be driven in order to provide torque or power. All motor(s) may be utilized when an amount of heavy or compact material is to be handled. Use of multiple motors enables providing and emphasizing desired properties and functionality, for example in view of speed, power and/or torque, for a waste management device.

In FIG. 3a three motors 305 are presented. This enables providing speed and power according to present needs. If more power is desired, one or more motors 305, as illustrated in FIG. 3b, may be fixed to the modular power system 306. Adding motor units enables providing more power for rotating the cylindrical part of the waste handling device, like a rotor or a roller. Motors 305 may have different power outputs, sizes or capacities. Size of the motor has effect on rotation speed and power provided for the cylindrical part. For example, smaller displacement of motor enables rotating the cylindrical part with higher speed compared to bigger displacement of motor, which in turn enables providing more power or torque for the cylindrical part. When an electric motor is used, then controlling is provided according to any common, known or new control techniques for electric motors. When speed is emphasized, a small motor among the motors may be driven. Alternatively, one/more motors may have bigger gear, a driving gear wheel or transmission ratio compared to other motor(s). Use of a motor(s) with bigger transmission ratio enables providing higher rotation speed for the cylindrical part. As an example, 1000 litres of oil may be fed to a hydraulic motor. In case of one motor, amount of speed provided for rotating a cylindrical part is emphasized. In comparison, in case the same amount of oil is fed for two motors, less speed and more power is provided for a cylindrical part. A amount of supplied oil, or correspondingly electricity for electric motors, may be adjusted. So, number of motors, type and size of motors, and capacity or power output of the motors, which are used or driven, may be selected, controlled and/or adjusted. The motors may be driven based on a present need. The present need may be effected by type and size of waste material, which is to be handled.

Multiple motors enable wide areas of use with a single waste management device. The single waste management device may be used in different environment for managing/handling different kind of waste. This provides further flexibility for utilizing and reusing a single waste management device for multiple purposes and with different or variable kind of waste materials.

Multiple motors, optionally of different kind, size, gear and/or transmission ratio, enable optimizing performance and efficiency, as well as power transfer ratio of a waste management device. When speed is emphasized, displacement of hydraulic motors may be reduced. The adjustments using multiple motors enable handling even small or soft material using big device efficiently. A waste management device may weight 20-60 tons, thus there is great variation in basic structure, components and power of waste management devices. Ability, capability and effectivity, as well as efficiency of a waste management device may be enhanced by enabling control of number of motors used, type of motors used, size of motors used, gear size(s) used and/or transmission ratio used.

Figure 4A:
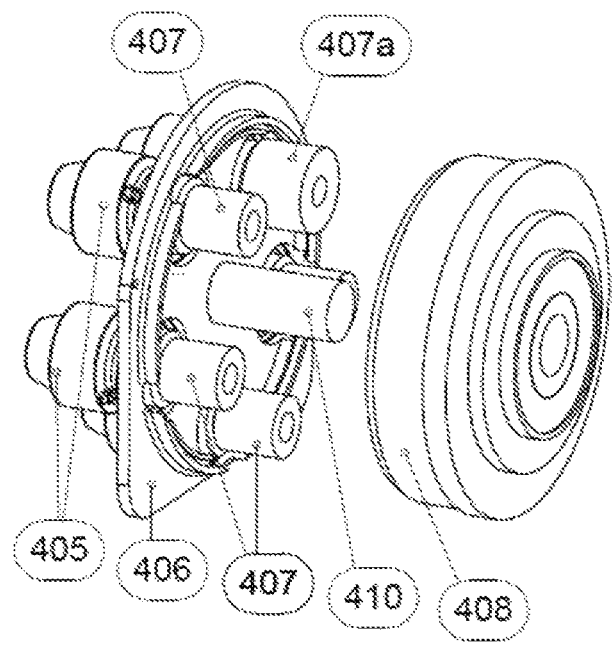
FIG. 4a illustrates a modular power system according to an embodiment.

FIG. 4a illustrates a modular power system according to an embodiment. The modular power system comprises an internal gear wheel 408, or a ring wheel, which is operably connectable at a longitudinal end of a cylindrical component of the waste management device. A frame 406, or a cover, is attached to the internal gear wheel 408, at an open side of the internal gear wheel 408, which is opposite to a closed side arranged towards the cylindrical component. One or more motors 405 are fixed to the frame. Driving wheels 407, 407a of the one or more motors are enclosed between the frame and the internal gear wheel 408, which may be a ring wheel. The internal gear wheel 408 comprises geared internal surface and an external cylindric surface. The internal gear wheel 408 may comprise a closed end and an open end. The open end is arranged towards the motor(s) 405 and the frame 406. The frame 406 may comprise an axle 410. The frame 406 and the external surface of the internal gear wheel 408 form an enclosure or a housing or a casing, wherein driving wheels 407, 407a and internal gears of the internal gear wheel 408 are enclosed. The enclosure enables protecting the driving wheels 407, 407a and the internal gears of the internal gear wheel 408. The internal gear wheel 408 is arranged to rotate around an axle 410. The modular power system of FIG. 4a comprises power source, being motors 405. The motors 405 comprise driving wheels 407, 407a, which are attached to, or meshing with, internal gears of the internal gear wheel 408. The driving wheels 407, 407a may comprise gears, gearwheels, cogwheels, pinions or follower gears. Power output of each of the motors 405 is directed to an internal gear wheel 408, which may be a toothed gearwheel or a ring wheel. Motors 405 may be connected to the modular power system mechanically, hydraulically and/or electrically.

A cylindrical component of a waste managing device, e.g. a roller of a compactor or a rotor of a shredder may be attached or secured to the internal gear wheel 408. The cylindrical component may be secured to a closed end, or optionally to an external cylinder surface, of the internal gear wheel 408. The cylindrical component may be securely fixed to the internal gear wheel 408, for example by screws. Power from the one or more motors is transmitted to the internal gear wheel 408, which is arranged to rotate the cylindrical component. A shaft of a roller or a rotor is arranged to connect to the modular power system. The cylindrical component may be attached to the internal gear wheel 408 or to a ring wheel via a coupling, which may comprise a coupling element, for example a spline coupling. A coupling may compensate some displacement, vibration or oscillation of the cylindrical component. The coupling may reduce load of the modular transmission system, or shafts, axels and/or gears of an arrangement, during use.

Figure 4B:
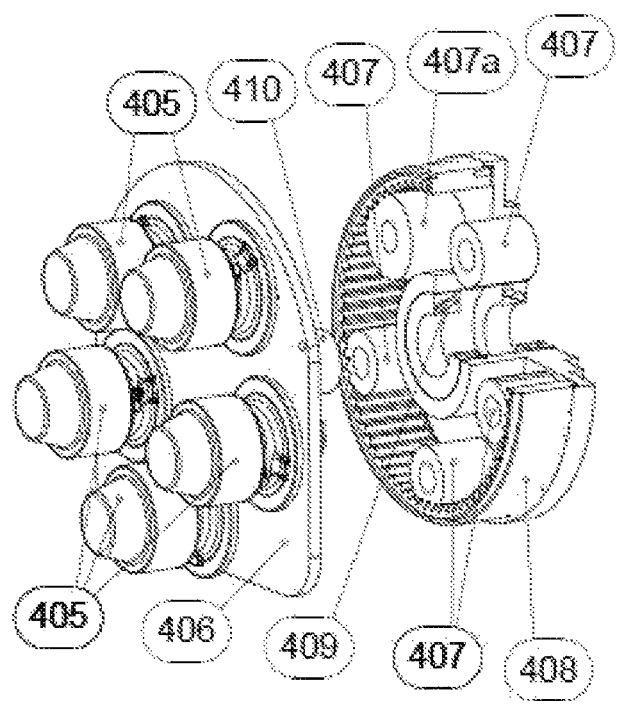
FIG. 4b illustrates a modular power system according to an embodiment.

FIG. 4b illustrates a modular power system according to an embodiment. The output from the power source, i.e. motors 405, is directed via driving gears 407, 407a to an internal gear wheel 408. The internal gear wheel 408 is arranged to drive or rotate a cylindrical component. The modular power system is arranged to mediate the power from one or more motors 405 to the internal gear wheel 408, and further to a roller or to a rotor attached to it. The internal gear wheel 408 is rotatably attached to an axle 410 via a bearing 409. Each motor, when driven, supplies power to its driving gear 407, 407a, which is engaged to the internal gear wheel via meshing gears. Internal gears of the internal gear wheel 408 are arranged in contact with external toothed surfaces of driving wheels 407, 407a of the motors 405.

As illustrated in FIGS. 4a and 4b, motors 405 may be placed around an axle 410. The axle 410 is arranged to form an axle of rotation of the ring wheel 408. Each motor 405 comprises a driving wheel 407, 407a for transmitting power. The driving wheels 407, 407a transmit rotational motion via meshing gears to the internal gear wheel 408. A modular power system may comprise a gearbox, which is fitted between the power supplying motors 405 and the rotatable cylindrical component of a waste management device. The motors 405 may be placed next to each other, at a predefined places on a cover or a frame 406. The motors 405 are not necessarily symmetrical around a cover 406 and/or the axle 410. Placement of the motors 405 may be selected based, at least partly, on characteristics of driving wheels 407, 407a, which may be of different size, gear clearance and/or diameter. FIG. 4ab show the driving wheel 407a, which has bigger diameter compared to other driving wheels 407. The driving wheel 407a comprises different transmission ratio than the other driving wheels 407. The driving wheel 407a with a big diameter enables providing more speed, while in comparison, a driving wheel 407 with a smaller diameter enables providing less speed and more power or torque. So, use of a motor 405 having a smaller driving wheel diameter 407 or a motor having a bigger driving wheel diameter 407a has effect on provided output of the motor(s) 405. This provides further flexibility for utilizing multiple motors.

Hydraulic motors may differ in their volume flow; electric motors may differ in their performance. If same amount of oil is supplied to motors of different sizes, e.g. motors having volume flow of 500 l/min and 700 l/min, the motor with the bigger volume flow provides more power. In known one-motor planet gear it is possible to adjust output by adjusting amount of supplied oil. With two separate motor units it is, for example, possible to double the power and make the rotation four times faster. A motor 405 is fixed to a frame 406. The frame 406 comprises two or more places for receiving motors. Motor(s) 405 and place(s) of the motor(s) 405 may be selected, for example based on size of driving wheels 407, 407a. Smaller motor 405 (in comparison to bigger one) enables faster rotational speed with a driving wheel 407a having a larger diameter. It is possible to add, remove and/or change motors. By removing the frame 406 or cover part, the driving wheels 407, 407a or places for possible additional driving wheels of the motors may be accessed. In FIG. 4ab the modular power system comprises a motor having a bigger gear 407a and four motors having smaller gears 407. Placement of gears 407, 407a corresponds to places of installation of motors on the cover or frame 406. A place for receiving a motor may be called a mounting. Motors 405 comprise driving wheels 407, 407a of certain size. Type and size of the motor 405 may be selected. These provide different alternatives for output, while each motor 405 may be driven individually or two or more motors may be driven together with a desired efficiency or power. A user may select handled waste material or type of such. For example, heavy or light material, homogenous or non-uniform material. Alternatively, or in addition, the motors may be controlled based on present flow of material. For example, if impacts or shocks are detected, the material may comprise some harder and/or bigger pieces of material than expected or originally handled, and the motor(s) may be adjusted to slow down, for example by taking off one of the used motors.

Figure 5:
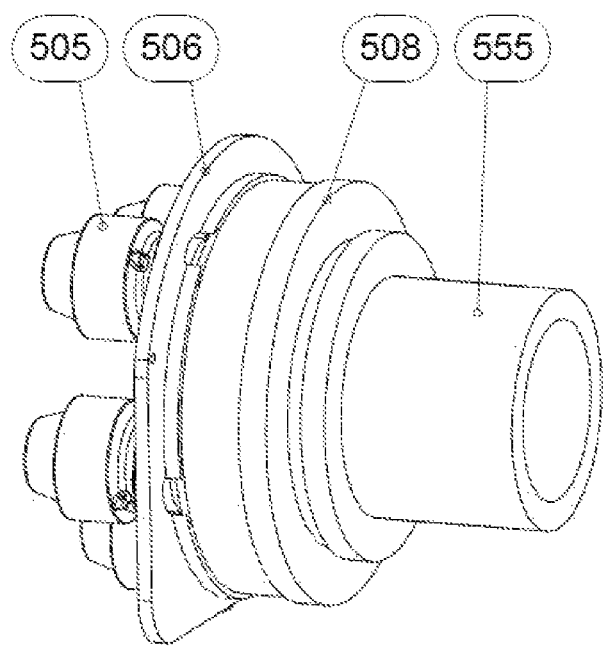
FIG. 5 illustrates a modular power system according to an embodiment.

FIG. 5 illustrates a modular power system according to an embodiment. Motors 505 are fixed to a frame 506 and operably attached to an internal gear wheel 508. Gears of the internal gear wheel 508 and driving wheels of the motors 505 are enclosed between the internal gear wheel 508 and the frame 506. The cylindrical component 555, which may be a roller or a rotor, is fixed to the internal gear wheel 508. The cylindrical component 555 may be secured to the internal gear wheel 508 by screws. The cylindrical component 555 is arranged to rotate with the internal gear wheel 508, which is driven by the motors 505.

Individual controlling of the motors provides flexibility. A motor controller may control starting and stopping the motor; selecting rotation direction; selecting and regulating speed; and/or regulating or limiting torque of the motor. For example, rotation speed and outputted power may be controlled motor by motor. When number of motors is increased and volume flow rate is decreased, rotation speed of motors is decreased. Outputted rotation speed and power or torque moment may be adjusted by number of motors and properties of the motors. Electric motors may enable faster phase shift and faster rotational speed compared to hydraulic motors, which in turn may enable more power to be provided compared to electric motors. A motor controller may monitor a motor load and accordingly match motor torque moment to the motor load. If a motor is run under light load, less torque moment is provided. This may enable effective use of motors, corresponding to needed power. This provides energy efficiency and/or less heat, noise and/or vibrations generated by a motor.

With two or more motors having individual motor controls it is possible to variate a waste management device and use of it by driving motors individually. Different kind of waste may be processed using a single waste management device, since working mode of the waste management device is adjustable. This enables avoiding transporting waste to another place for it to be processed. In addition, manufacturing of waste management machines may be simplified, since a single frame structure may be used for different kind of purposes and devices, which differ in amount of motors. Further, a waste management device may be updated or changed for another purpose by adding, removing or replacing motors.

Some embodiments of the invention are illustrated in the description with the attached figures. It is possible to add, remove, change or replace the illustrated parts. Modifications are possible in view of the scope according to the following claims.

The invention claimed is:

1. A modular power system for a waste management device comprising:
   a frame,
   one or more motors attached to the frame, and
   an internal gear wheel,
   wherein a driving gear wheel(s) of the one or more motor(s) are operably connected to the internal gear wheel, such that power of the one or more motors is transmitted from the driving gear wheel(s) to the internal gear wheel, and
   wherein the frame comprises an axle into which the internal gear wheel is rotatably attached via a bearing, and that a cylindrical component is secured to the internal gear wheel arranged to rotate the cylindrical component relative to the frame.

2. The modular power system according to claim 1, wherein the frame includes at least one additional mounting arranged to receive a motor of the one or more motor(s).

3. The modular power system according to claim 1, wherein the internal gear wheel is a ring wheel comprising internal gears.

4. The modular power system according to claim 1, wherein the modular power system comprises one or more hydraulic motor(s), or one or more electric motor(s).

5. The modular power system according to claim 1, wherein the one or more motors are individually controllable for adjusting at least one of: rotation speed, rotational torque and power of each of the one or more motors.

6. The modular power system according to claim 1, wherein the one or more motors are attachable, detachable or changeable to the frame or from the frame.

7. The modular power system according to claim 1, wherein at least one of: number, type and output power of the one or more motors: and a diameter of the corresponding driving gear wheel(s) is selectable.

8. The modular power system according to claim 1, wherein the driving gear wheel(s) of the one or more motor(s) and internal gears of the internal gear wheel are enclosed between the frame and the internal gear wheel.

9. A waste management device, comprising a modular power system according to claim 1 and at least one of: an input from the one or more motors; and an output from the one or more motors, wherein power from the one or more motors is transmitted to the cylindrical component.

10. The waste management device according to claim 7, comprising an arrangement for controlling power transmission based at least one of:
number of the motor(s) driven,
type of the motor(s) driven,
output, power or capacity of the motor(s) driven, and
size of the driving wheel(s) of the motor(s) driven.

11. The waste management device according to claim 7, wherein the cylindrical component comprises at least one roller of a compactor or at least one rotor of a shredder.

12. The modular power system according to claim 1, wherein the one or more motors are attachable, detachable or changeable to the frame or from the frame, such that driving gear wheel(s) of the one or more motors mesh with internal gears of the internal gear wheel.

13. The modular power system according to claim 6, wherein the internal gear wheel comprises an external cylinder surface having an open side arranged towards the frame and a closed side opposite to the open side.

14. The waste management device according to claim 7, wherein one longitudinal end of the cylindrical component is secured to the internal gear wheel of the modular power system via a coupling element.

* * * * *